United States Patent [19]
Rucker

[11] 3,895,727
[45] July 22, 1975

[54] POULTRY TRANSPORT SYSTEM

[76] Inventor: Stanley E. Rucker, 8 Highland Dr., St. Charles, Mo. 63301

[22] Filed: Nov. 12, 1973

[21] Appl. No.: 414,797

Related U.S. Application Data

[62] Division of Ser. No. 224,663, Feb. 9, 1972.

[52] U.S. Cl. ............ 214/85; 119/17; 296/1 A
[51] Int. Cl. ............................................. B60p 1/00
[58] Field of Search ............ 214/85; 296/14, 1 A, 3; 119/12, 18, 17

[56] References Cited
UNITED STATES PATENTS

| | | | |
|---|---|---|---|
| 48,847 | 7/1865 | Smith | 214/85 |
| 318,812 | 5/1885 | Smith and Miller | 119/17 |
| 1,456,630 | 5/1923 | Eaton | 296/14 |
| 1,469,384 | 10/1923 | Danley | 119/17 |
| 1,814,979 | 7/1931 | Taylor | 119/17 |
| 1,865,569 | 7/1932 | Judd | 296/1 A |
| 1,932,225 | 10/1933 | Minter | 214/85 |
| 2,061,712 | 11/1936 | Martin | 119/18 |
| 3,051,336 | 8/1962 | Felsten | 214/85 |
| 3,621,818 | 11/1971 | Johnston et al. | 119/12 |

Primary Examiner—Robert J. Spar
Assistant Examiner—Gary Auton
Attorney, Agent, or Firm—Paul M. Denk

[57] ABSTRACT

A dolly cage and trailer for transporting a plurality of the cages are provided, the design of which reduces handling and shipping procedures involved in moving live fowl, and particularly turkeys and chickens, to market. The cage is partitioned, preferably containing seven layers, and is mounted on casters. The cage structure has a one way, free swinging door closing both ends of it. The free swinging door permits easy loading of the cage with live poultry. The animals are restricted to the cage by the one way door action. The trailer includes a self contained ramp which permits cage loading. The ramp also functions as closure means for the trailer entrance during cage transport. In the embodiment illustrated, twenty-two cages can be positioned on the trailer bed which positioning exemplifies maximum loading techniques consonant with minimum trailer size.

1 Claim, 13 Drawing Figures

PATENTED JUL 22 1975 3,895,727

SHEET 1

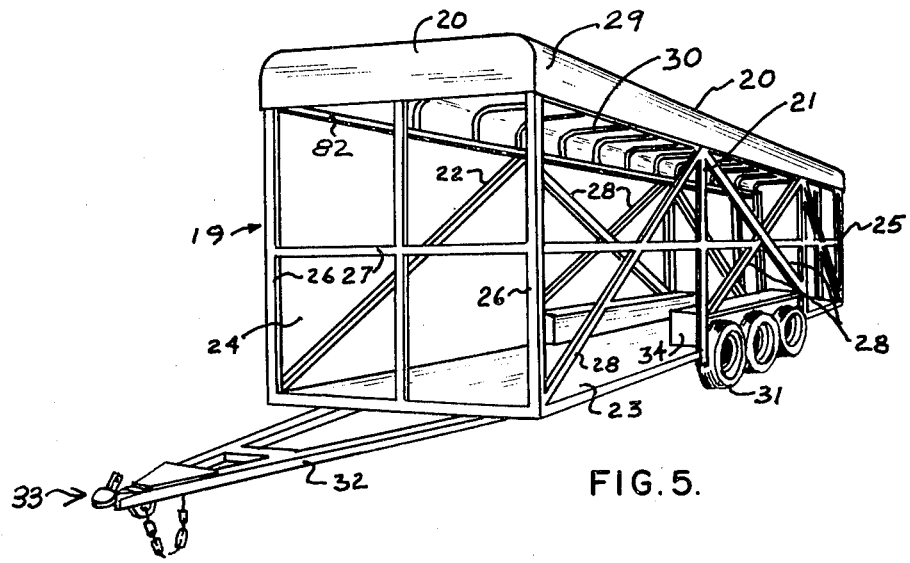
FIG. 5.
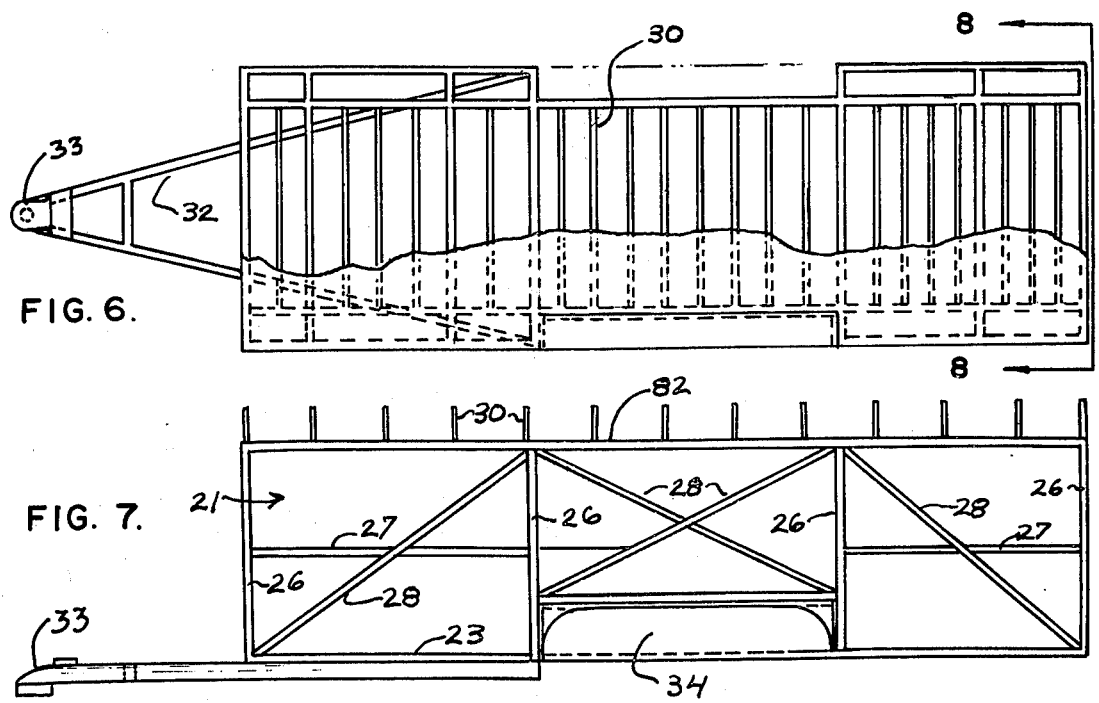
FIG. 6.
FIG. 7.
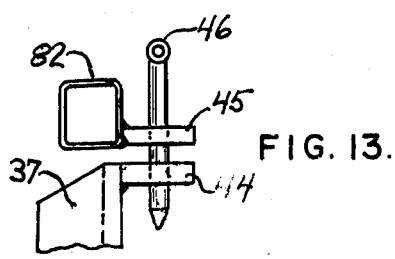
FIG. 13.

PATENTED JUL 22 1975　　　　　　　　　　　　　3,895,727

SHEET　　　3

POULTRY TRANSPORT SYSTEM

BACKGROUND OF THE INVENTION

This invention relates to animal transport systems, and in particular, to a cage and trailer arrangement for transporting live fowl between breeding and marketing locations.

The prior art reveals a variety of live haul poultry equipment, particularly cages and motor vehicles designed for this purpose. While these prior art efforts work well for their intended purposes, they are characterized by inefficient loading of their associated trailer, or require special and relatively expensive equipment for loading or for other purposes, or exhibit other detrimental features which have limited their commercial acceptance. For example, both the U.S. to Mayo, No. 3,173,564, issued Mar. 16, 1965; and the U.S. Pat. to Nater, No. 3,476,084, issued Nov. 4, 1969, disclose pertinent prior art. In Mayo, a truck trailer is provided with a series of integrally partitioned cage like members disposed about a frame. Each layer of the structure has a conveyor floor which has a series of flexible partitioned walls spring hinged to it. The partition walls bend downwardly when they encounter the loading conveyor so that poultry may be conveyed up onto the various layers of the truck. The partitioned layer conveyor turns a fixed distance and acts to partition off a quantity of poultry and to bring the next partition wall into alignment with the loading conveyor. In Nater, a trailer is compartmentalized by means of a series of structures that are resilient and bend or flex under the impact of poultry being loaded into the device.

Numerous other systems have been devised for transporting live poultry. In general, these systems disclose a specialized truck or similar vehicle structure. Such structures commonly require special loading apparatus in order to load either the provided cage structure, the vehicle, or both.

My invention provides an extremely easy to handle poultry cage. The cage structure itself is mounted on casters which permit hand movement of the loaded cages. While a trailer is disclosed which provides maximum loading capabilities in a minimum size, the cage of this invention is compatible with other vehicle types and no special vehicular structure is required.

The disclosed trailer includes a self contained ramp structure and poultry laden cages merely are pushed by hand into the trailer, via the ramp. Power assist loading may be provided, if desired. The ramp serves a dual function in that it also positively closes the rear entrance to the trailer.

One of the objects of this invention is to provide a low cost cage structure for transporting live poultry.

Another object of this invention is to provide a cage structure for live poultry that is movable manually.

Yet another object of this invention is to provide a trailer and cage for loading thereon which combination provides high density loading of live poultry.

Yet another object of this invention is to provide a trailer having a self-contained loading ramp.

Still another object of this invention is to provide a trailer and loading ramp structure which ramp also functions to positively close the trailer entrance.

Other objects will become apparent to those skilled in the art in the light of the following description and accompanying drawings.

SUMMARY OF THE INVENTION

In accordance with this invention, generally stated, a trailer and movable poultry cage are provided which simplify loading and transportation of live poultry.

In the preferred embodiment, the cage is a seven tier structure having simply constructed, one-way doors which permit loading of each cage tier. The cage is mounted on casters for ease of movement. The trailer is a skeleton construction with a self contained ramp structure. The ramp is lowered manually to load or unload cages and is raised to a horizontal position to positively close the rear entry of the trailer.

BRIEF DESCRIPTION OF THE DRAWINGS

In the drawings.

FIG. 5 is a view in perspective of one illustrative embodiment of trailer of this invention, shown in its unloaded condition;

FIG. 6 is a top plan view, partly broken away, of the trailer shown in FIG. 5;

FIG. 7 is a view in side elevation, partly broken away, of the trailer shown in FIG. 5;

FIG. 13 is a view taken along the line 13—13 of FIG. 12.

DESCRIPTION OF THE PREFERRED EMBODIMENT

Figure 1:
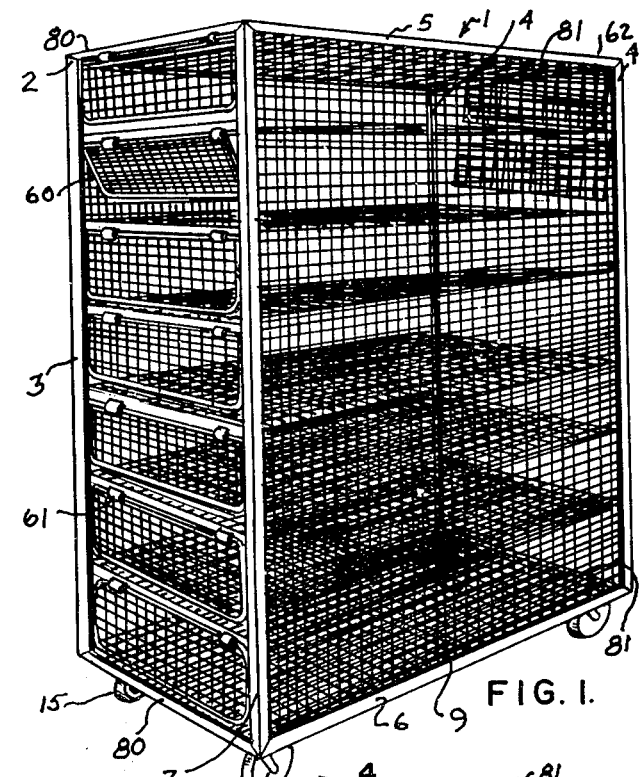
FIG. 1 is a view in perspective of one illustrative embodiment of animal cage of this invention.

Referring now to FIG. 1, reference numeral 1 refers generally to the preferred embodiment for the cage of this invention. Cage 1 has a skeleton type frame 2 which delineates the outer boundary edges of the cage 1. Frame 2 includes a first pair of parallel, vertical side rails 3, a second pair of parallel, vertical side rails 4, an upper pair of horizontal members 5 and a lower pair of horizontal members 6. The members 5 and 6 extend perpendicularly from and between the rail pairs 3 and 4. A first brace pair 80 extends between rail pair 3, and is perpendicular to them, at each end of the rail pair 3. A second brace pair 81 extends between rail pair 4, and is perpendicular to them, at each end of the rail pair 4. The pairs 3 and 4 and the horizontal members 5 and 6; the braces 80 and 81 and the horizontal members 5; the braces 80 and 81 and the horizontal members 6; the brace pair 80 and the rail pair 3; and the brace pair 81 and the rail pair 4 respectively form the oppositely opposed side walls for the rectangular shaped skeleton structure illustrated in FIG. 1.

The rails 3 and 4, the members 5 and 6, and the braces 80 and 81 in the preferred embodiment, are constructed from any conventional material. Common angle iron works well, for example, giving the rails, members and braces an L-shaped in cross section. Other forms of structural steel or different geometric designs may be utilized in other embodiments in my invention. The rail pairs, horizontal member pairs, and braces are joined at eight positions, corresponding to the corners of the rectangular cage illustrated, by any convenient method. For example, spot welding works well.

The volume enclosed by the rail pairs, member pairs, and brace pairs is further compartmentalized by a plurality of layers 7. The layers 7 have a pair of end parts 8 running horizontally between the rail pairs 3 and 4 and parallel to the braces 80 and 81 at each end of the cage 1. The parts 8 are attached to the rail pairs 3 and 4 by any convenient method. Rivets, spot welds, nut and bolt, or similar fasteners all are satisfactory. It is important, however, that the pairs 8 be attached to the rail pairs along the internal surfaces of the rail pair L-shape. The end parts 8 are conventional in that they may be constructed from a variety of common structural components. Thus, the parts 8 may be tubular, or L-shaped in the conventional angle iron form.

Reaches of wire mesh 9 are attached to and between the members 5 and 6; between the member 5; between the member pair 6, and between the rail pairs 3 and 4; and along the layers 7 between the end parts 8. Other closure material is suitable. Thus, nylon rope or similar material may be utilized for this purpose.

The volume of each layer 7 is divided by a partition 50. The partition 50 is constructed from wire mesh 9. Each layer 7 is divided merely by attaching the mesh 9 of the partition 50 to the mesh 9 attached to and between the rail pairs 3 and 4 and to contiguous layers 7.

At least one side of the cage 1 is closed by a plurality of hinge doors 10. In the preferred embodiment of FIG. 1, both a side 60 between the rail pair 3 and a side 62 are so closed. Those skilled in the art will recognize that the door 10 may be positioned elsewhere along the cage structure. Use of doors 10 on both the sides 60 and 62 permits simultaneous loading of the cage 1. Even where the sides are loaded alternately, better distribution of live poultry is provided by cage loading through each side. The use of a pair of doors 10, a requirement because of the partition 50, enables the cage of this invention to be loaded quickly and easily but prevents over crowding in loading. I have found over crowding to be a major reason for poultry loss during transit.

Figure 2:
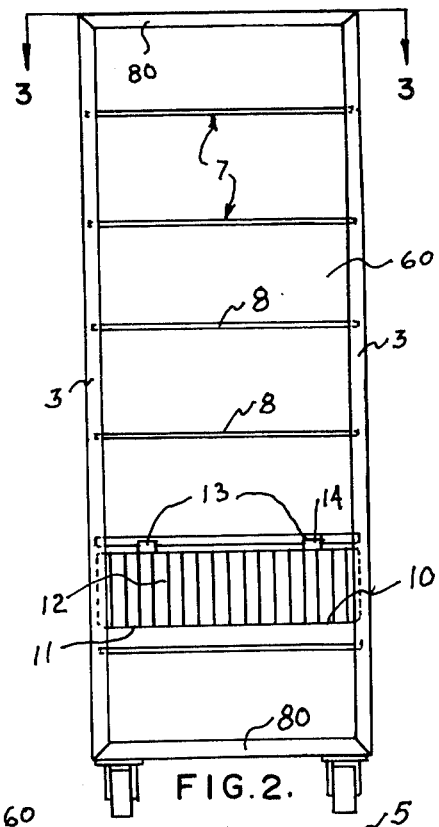
FIG. 2 is a view in side elevation of the animal cage shown in FIG. 1.

Door 10 includes a frame 11, a mesh surface 12, and a pair of hinges 13. In the embodiment illustrated, the frame 11 generally is rectangular and the mesh surface 12 is similar to the mesh 9 utilized on the remaining cage surfaces. The hinges 13 are adapted for attachment to the end parts 8. As is best illustrated in FIG. 2, the doors 10 are mounted on end parts 8 so as to abut the internal surface of the angle iron utilized in the construction of the rail pair 3. Hinges 13 are conventional. It may be convenient to utilize hinges which include an attaching part 14. Attaching part 14 includes an arcuate wall 61 that may be mounted on the end parts 8 by any simple procedure, as by bending, for example. Other attaching means are acceptable.

Figure 4:
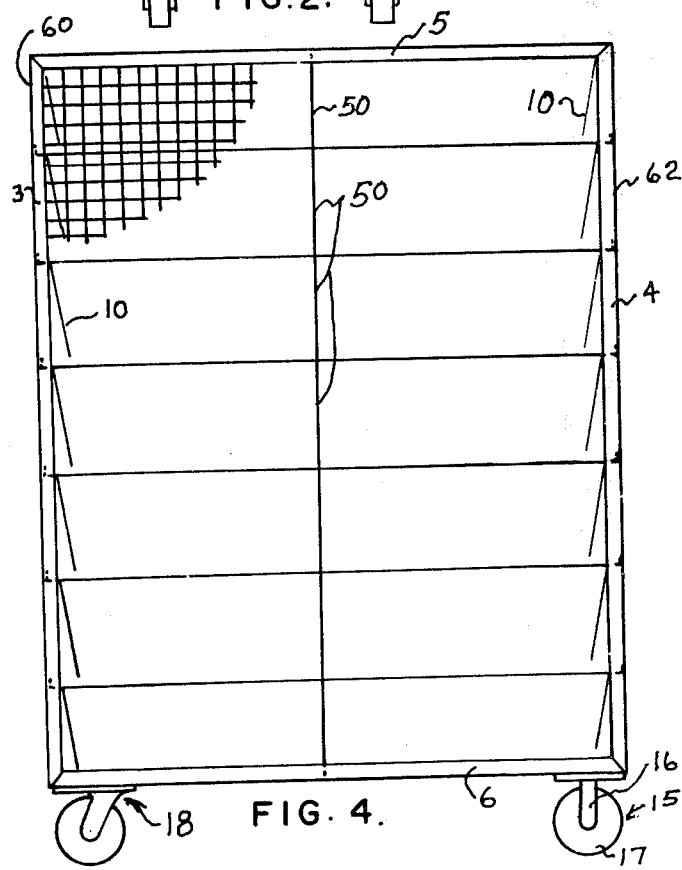
FIG. 4 is a view in side elevation taken along the line 4—4 of FIG. 3.
Figure 3:
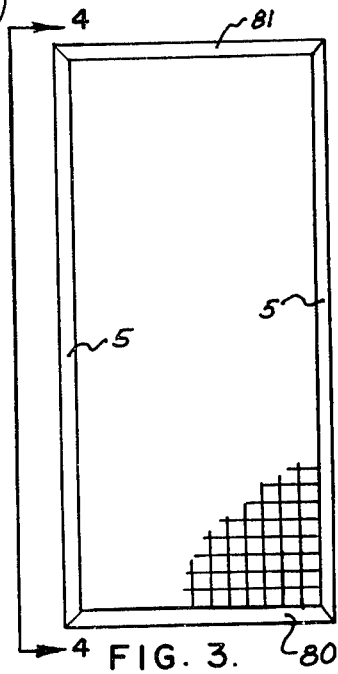
FIG. 3 is a top plan view taken along the line 3—3 of FIG. 2.

Cage 1 is mounted on a plurality of casters 15. Casters 15 are conventional and include a mounting assembly 16 and a wheel 17. Assembly 16 is mounted to the lower members 6 at each corner of the cage 1. In the preferred embodiment, four casters are utilized. I find it convenient and desirable to provide rotationally free casters in the left caster position 18, as those positioned are shown in FIG. 4. Use of rotationally free casters in this position provides better manual handling of the cage of this invention. While the preferred embodiment utilizes a four caster construction, other embodiments of my invention may be adapted to other caster arrangements which may vary the number of casters utilized. I find the four caster arrangements illustrated particularly convenient for use with the trailer ramp discussed hereinafter.

Referring now to FIG. 5, reference numeral 19 indicates a trailer designed to accommodate the cage of FIG. 1. The trailer 19 is of skeleton construction and includes a top structure 20, sides 21 and 22, a bed 23, a front 24 and a back 25. The sides of the trailer 19 are a skeleton structure in that the sides 21, 22 and the front 24 comprise a plurality of vertical posts 26, a horizontal support 27 running between posts 26, and a series of diagonal supports 28 positioned to add structural rigidity to the other horizontal and vertical members.

In the embodiment illustrated, top 20 includes a water proof, canvas cover 29 which is stretched over and attached to a series of struts 30. Struts 30 are elongated U shaped members which are attached to an upper horizontal post 82 which delimits the vertical height of the side walls 21 and 22.

Bed 23 of trailer 19 is conventional and may comprise any convenient floor covering. Wood or metal both work well. Bed 23 is mounted on a conventional axle structure indicated generally at 31. In the preferred embodiment, I have utilized a six wheel design to accommodate the trailer of my invention. Other wheel and axle arrangements may be utilized. The bed 23 has wheel covers 34 mounted on it, which protect the flat bed 23 from the wheel and road environment. Covers 34 may be constructed integrally with bed 23 or may be fabricated separately and later affixed to the bed 23.

A V-shaped framework 32 is used to attach the trailer 19 to a control vehicle not shown. Framework 32 is attached to bed 23 at one end, and meets at a goose neck or ball hitch 33 at its pointed end. Hitch 33 may be any conventional trailer connection.

Figure 8:
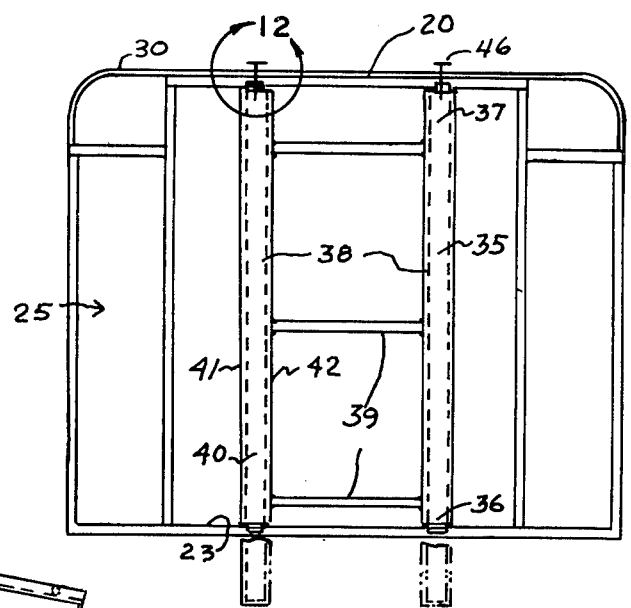
FIG. 8 is a view taken along the line 8—8 of FIG. 6.

Back 25 is best illustrated in FIG. 8. As there shown, the skeleton construction of the trailer further includes a ramp 35. Ramp 35 is hinge mounted to bed 23 at an end 36 and is removably mounted to top 20 at an end 37. Ramp 35 includes a pair of parallel tracks 38 and has a plurality of support beams 39 attached perpendicularly between the tracks 38. The beams 39 provide structural rigidity for the ramp 35.

Each track 38 is channel shaped, having a bottom wall 40, and spaced parallel side walls 41 and 42. The distance between the walls 41 and 42 is chosen so that the channel thereby defined accepts casters 15 during loading. For this reason, a four caster cage structure is particularly suited for use with the ramp 35.

Figure 11:
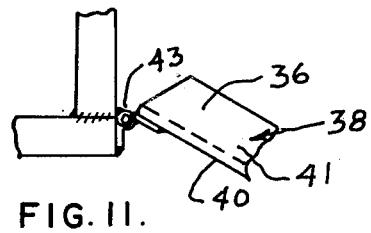
FIG. 11 is an enlarged view, partly broken away, taken about the area 11—11 of FIG. 9.

As is best illustrated in FIG. 11, each end 36 of the tracks 38 are attached to bed 23 by a hinge 43. Hinge 43 is conventional and several commercially available products are suitable. Some care, however, must be taken to insure sufficient structural strength of the hinge 43 in order to provide long life for that member in view of many loading and unloading operations.

Figure 9:
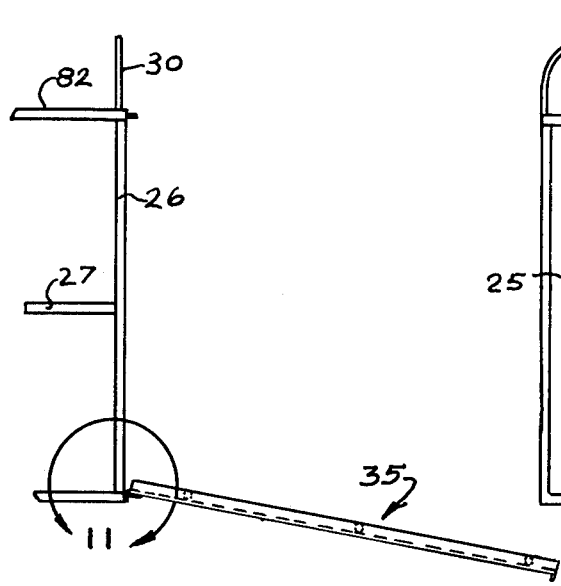
FIG. 9 is a view in side elevation, partly broken away, illustrating a self-contained ramp in its lowered position.
Figure 10:
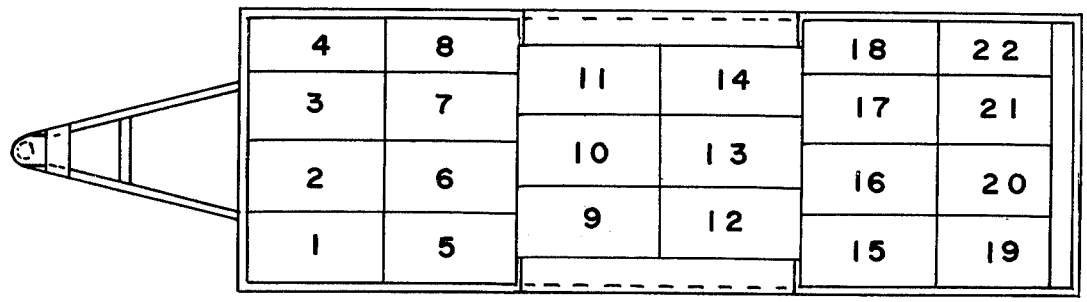
FIG. 10 is a diagrammatic view illustrating the loading plan for the trailer shown in FIG. 5.
Figure 12:
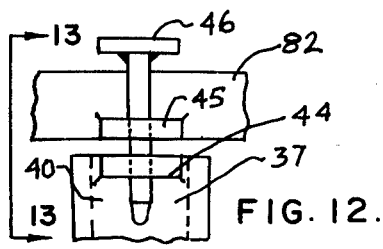
FIG. 12 is an enlarged view, partly broken away, taken about the area 12—12 of FIG. 8.

As illustrated in FIG. 12, end 37 of track 38 has a notch or tab 44 formed on it. Notch 44 may be constructed integrally with wall 40 or may be constructed separately and later affixed to that wall. Horizontal member 27 also has a notch or tab 45 mounted to it, positioned to align with the notch 44 when the track 38 is in its raised position. When so raised, a T-shaped lock pin 46 is inserted through the notches 45 and 44 to positively lock the ramp 35 in its upward position. When so locked, the ramp 35 closes back 25 of trailer 19. As thus described, a trailer is provided that is characterized by simple construction and ease of loading. The down position of the ramp 35, shown in FIG. 9 is designed to present only a slight incline, easily overcome, during cage loading. As is demonstrated in FIG. 10, maximum loading capability is provided in minimum trailer size.

Operational use of the combination trailer and cage of this invention is both efficient and simple. Live poultry is placed in each tier of the cage. Easy access to each tier is provided by the inwardly swinging door 10. Poultry in the cage are restricted thereto by the one way nature of door 10 operation. The door 10 is prevented from swinging outwardly because it abuts the internal surface of the L-shaped rail pair 3. The cage 1 may be wheeled directly to any convenient loading site. After loading, the cage 1 is easily maneuvered to wherever the trailer of this invention is located, if they are in fact physically separated. The cage itself may be hand loaded, or loading may be automated. Regardless of whether automated loading means are available, however, the cage of this invention is intended for efficient hand loading as described above. Each cage thereafter individually is pushed up the ramp 35 and positioned along trailer bed 23 according to the diagram of FIG. 10. The casters 15 may include brake means for locking the casters into position, or other conventional chocks may be provided to prevent cage shifting during transit.

In unloading, the cages merely are removed from the bed 23 via the ramp 35. Because skeleton construction is utilized for both the trailer 19 and cage structure 1, it is easy to clean the combination after use. A simple wash down being sufficient after most shipments.

Numerous variations, within the scope of the appended claims will occur to those skilled in the art in light of the foregoing description and accompanying drawings. Thus, the design of the skeleton structure of the trailer may be varied. Likewise, the design or construction of top 20 may be changed. For example, while a canvas covering was described, the top 20 may be aluminum or fiberglass. Provisions may be included for drop curtains along the side 22 and 23 and front 24. The design of the cage 1 also may be changed. While a seven tier cage is provided, the number of tiers may vary. Material other than mesh may be utilized in the construction of the cage. While I prefer a wire mesh because of its cleaning ease, plastic or nylon mesh may be utilized. Other locking means may be provided in lieu of a T shape lock pin. These variations are merely illustrative.

I claim:

1. In a combined cage for transporting live poultry and a vehicle for transferring the same comprising, a cage having a pair of oppositely opposed side wall members, a pair of oppositely opposed end wall members, a pair of oppositely opposed upper and lower wall members, means for attaching said wall member pairs to one another to form a generally rectangular structure, a plurality of partition members extending from and between the said side and end wall members, and arranged parallel to said upper and lower wall members thereby dividing the volume enclosed by said pairs of wall members into a plurality of compartments, a dividing means arranged perpendicularly to said partition members, extending from and between said side wall members and upper and lower wall members, and being arranged intermediate between said end wall members to divide a plurality of compartments into approximate halves lengthwise, access means to each of said plural compartments and arranged in each of the end wall members of said structure, each access means including a door pivotally depending from said cage and adapted to pivot inwardly of its respective compartment to provide ingress into said compartment, the side edges of each door being disposed for contact with the inner edge of the adjacent end wall to prevent said door from pivoting and opening outwardly, a plurality of casters mounted to the lower wall member, each of said side wall members, upper and lower wall members, partition members, dividing means, and access doors comprising a skeleton structure covered with wire mesh, and the arrangement of the pivotal doors provided in each end wall member of a cage facilitating the compact side-by-side placement of a plurality of cages as during usage, said vehicle including a flat bed structure having at least one access opening thereto, an axle and wheel structure mounted to the underside of said flat bed structure, vehicle skeleton structure mounted upon said bed and delimiting an enclosed area capable of sustaining a plurality of said cages in both adjacent and tandem relationship, ramp means pivotally mounted to the back end of said flat bed structure and providing the instrumentality for loading and removal of said plurality of cages, said ramp means having a first and second position, said first position being designed for loading said vehicle, and said second position being designed such that said ramp becomes a back for the side vehicle skeleton structure for closing of the vehicle, said ramp means comprising first and second channel shaped track parts and support beams between said track parts, said track parts being spaced apart a distance by said support beams to accommodate the movement of the castered cage upon the ramp means, one end of each first and second track parts being hingedly mounted to the back end of said flat bed structure, the other end of said track parts being tabbed, corresponding tabs provided upon the back of the vehicle skeleton structure and being in alignment with the track tabs as when the tracks are pivoted into closure with the back of the said structure, and locking pins cooperating between the tabbed ends of the track parts and the aligned tabs of the vehicle skeleton structure to secure said pair of track parts into the position of function as the back for the flat bed structure for securely retaining the loaded cages upon the vehicle during its transit.

* * * * *